July 18, 1950 M. HATTAN 2,515,220
SELF-LOCKING NUT
Filed Aug. 9, 1945

INVENTOR.
— MARK HATTAN —
BY Clade Krontz
ATTORNEY

Patented July 18, 1950

2,515,220

UNITED STATES PATENT OFFICE 2,515,220

SELF-LOCKING NUT

Mark Hattan, Dayton, Ohio

Application August 9, 1945, Serial No. 609,900

3 Claims. (Cl. 151—14)

(Granted under the act of March 3, 1883, as amended April 30, 1928; 370 O. G. 757)

The invention described herein may be manufactured and used by or for Government for governmental purposes, without the payment to me of any royalty thereon.

This invention relates to self-locking nuts and in general aims to improve upon the nut construction disclosed in my pending application Serial No. 522,081 filed February 12, 1944, now Patent No. 2,464,808.

According to the disclosure of said pending application, a self-locking nut consisting of two parts is provided, one part being the nut casing or shell, the other, a closely coiled helical spring fitted in the casing and held between inturned end flanges integral with the casing. The spring is so shaped that it provides threads for the nut and has a plurality of waves or deformations of small amplitude which are straightened or flattened out by the reactions on the spring when the nut is threaded on a bolt or stud. These reactions create a relatively high torque, which locks the nut against turning. The flange at the bottom or base of the casing has a spiral shoulder or seat on the inside, which the bottom end of the spiral spring abuts, while the top flange is turned over tightly against the top end of the spring to hold the latter against rotation inside the casing when the nut is threaded on or off a bolt or stud. If the number of the waves or deformations is considerable, and their amplitude is relatively large, the high torque thus imparted to the nut causes the helical spring to tend to rotate, and since it engages the helical seat of the base flange, if it rotates at all it will move upwardly on the inclined plane of the helical seat and thrust against the top flange, which under the exceedingly high stresses set up when the nut is tightened may yield or "blow out." It should be explained that the top flange is turned in by spinning or by a die, and must be sufficiently soft to permit such turning in; and under very high stresses it will yield, unless special provision is made to prevent this undesirable result.

In accordance with the present invention, I provide special locking means between the casing and the helical spring to prevent any rotation whatever, while permitting the slight helical creeping of the coil spring which takes place when the waves or deformations are flattened out. With such locking means, the base flange does not need to have a helical seat for the spring, and the latter preferably has squared off ends abutting plane faces on the insides of the top and bottom flanges.

In the accompanying drawing forming a part of this specification,

Figure 1:
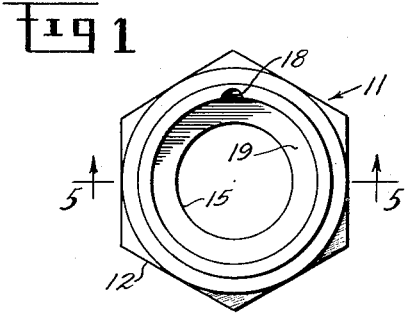
Fig. 1 is a top plan view of the nut casing.
Figure 5:
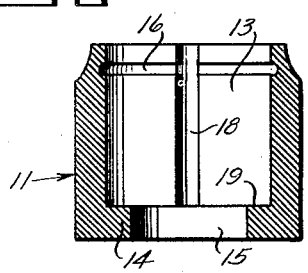
Fig. 5 is a section on line 5—5 of Fig. 1.
Figure 6:
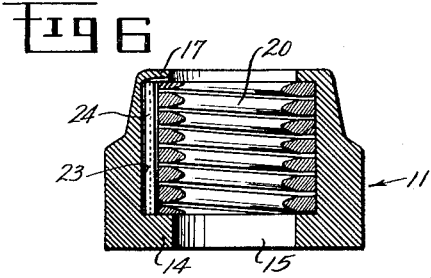
Fig. 6 is a longitudinal or diametric section through the completely assembled lock nut, the section being in the plane of the groove in the nut casing.

Referring particularly to the drawings, the nut casing 11 has the usual hexagonal outer walls 12 and a cylindrical inner wall 13, a base or bottom flange 14 having a central opening 15, and a narrow, circular groove 16 cut on the inside near the top, to facilitate turning the upper part of the casing inwardly to form the top flange 17, Fig. 6. Groove 16 may be dispensed with under certain circumstances. Extending longitudinally of the casing on the inside is a straight groove 18 which may be semi-circular, arcuate or rectangular in cross section but is shown as semi-circular in Figs. 1 and 5 and deeper than the circular groove 16, which it crosses. The base or bottom flange 14 may be formed either before or after cutting groove 18. The top or inside shoulder 19 of flange 14 is preferably plane and at right angles to the axis of cylindrical inner wall 13, and provides an abutment for the lower end of the helical spring 20, which will now be described.

Figure 4:
Fig. 4 is an enlarged elevation of part of the helical spring.
Figure 3:
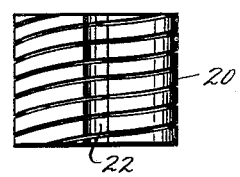
Fig. 3 is a side elevation of the helical spring.
Figure 9:
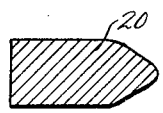
Fig. 9 is a greatly enlarged cross section through one convolution of the spring.

Helical spring 20 is preferably made of music wire, although it may be of stainless steel or other material of very high tensile strength, and when the nut is assembled it is housed within the casing in close contact with the inturned top and bottom flanges and the cylindrical inner surface 13 of the nut casing. The spring is closely coiled and so made on the interior that it may be threaded on a bolt or stud (see Fig. 9), and has a plurality of minute waves or deformations 21, Fig. 4, which have amplitudes of a few thousandths of an inch, and are flattened out or made to assume the shape of segments of the helix whenever the nut is screwed on a bolt or stud. There may be as many as four waves 21 in each convolution of the spring, and preferably the waves are nested as shown. As the material of the coil spring is of high resiliency, the flattening out of the waves or deformations creates a high torque or resistance to turning of the nut, which is sufficient to hold the nut securely on the bolt or stud regardless of vibrations, changes in temperature or other adverse service conditions. This high and constant torque is equally effective in either direction of turning. The coil spring necessarily is permitted a slight helical creeping within the casing, responsive to the flattening out of the waves or deformations and subsequent restoration of the waves to their original form when the nut has been removed, but relative rotation of the coil spring and casing obviously cannot be tolerated. Both ends of spring 20 are preferably ground flat, or at right angles to the axis of the helix of the spring as best shown in Fig. 3, so as to lie flat against the plane inside faces of the top and bottom flanges, see Fig. 6. If preferred, the waves or deformations may have their amplitudes measurable radially, as disclosed in my pending application Serial No. 558,707 filed October 14, 1944, and matured into Patent No. 2,402,159 of June 18, 1946.

Figure 2:
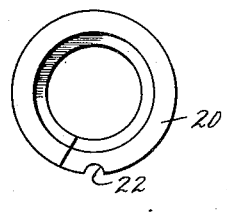
Fig. 2 is a top plan view of the helical spring.

As shown in Figs. 2 and 3, the helical spring 20 has a straight groove 22 cut in the outer surfaces of the closely coiled convolutions. Groove 22 may be either arcuate or rectangular in cross section but is shown as arcuate in Figs. 2 and 3 and is positioned directly opposite to groove 18 of the nut casing 11, the two grooves 22 and 18 being adapted to register to form together an opening 23 which is adapted to receive a straight length of locking wire 24, inserted prior to turning in of the top flange 17. The wire 24 serves as a lock to prevent any rotation of the spiral spring inside the casing. Locking wire 24 fits the opening 23 loosely so that the spring is free to creep helically to the slight extent necessary. After the locking wire has been inserted, the top flange is turned in by means of a die or by spinning. The locking wire prevents axial turning or rotation of the helical spring, as it is impossible to impose sufficient torque on the nut to shear the locking wire.

Figure 8:
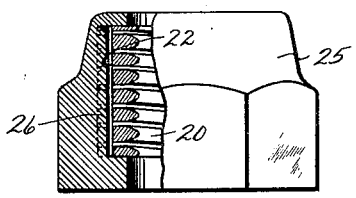
Fig. 8 is a sectional elevation of the modification shown in Fig. 7, the section being on line 8—8 of Fig. 7.
Figure 7:
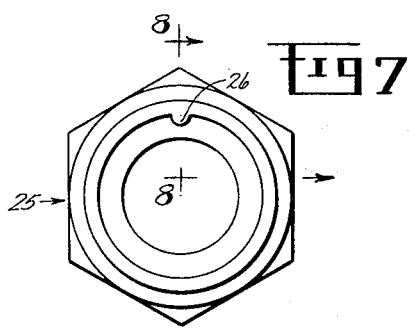
Fig. 7 is a top plan view of a modification of the nut casing.

In the form of Figs. 7 and 8, the casing 25 has a straight rib 26 which projects inwardly and which is adapted to fit rather loosely in the straight groove 22 cut in the outer faces of the convolutions of the spring. In other words rib 26 fits freely in groove 22 to permit creeping of the coil spring but to prevent rotation in the nut casing. The advantage of this construction is that no assembling of a length of wire in the casing is necessary. Also, there is a slight saving in material cost, as the rib 26 may be formed as cheaply as the groove 18 in the casing, or in other words, the cost of the wire itself is saved.

Figure 10:
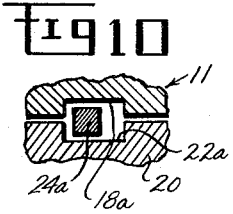
Fig. 10 is a greatly enlarged cross section showing the interlocking of another form of locking wire and its grooves.

In the modification shown in Fig. 10, the locking wire 24a is square in cross section and engages rectangular grooves 18a and 22a cut in the casing and coil spring, respectively. If preferred, wire 24a may engage an arcuate or semi-circular groove in the casing, which would be a stronger construction, and a rectangular groove 22a in the coil spring. Either arrangement will lock the coil spring as a whole yet will permit limited creeping.

In one form of the described invention a straight length of wire engages complementary grooves in a coil spring and in a nut casing, while in the other form, a straight rib formed on the casing engages a straight groove in the coil spring, and in each case the groove in the coil spring extends for the entire length of the spring. It is not essential that these grooves be parallel to the axis of the spring, nor that they be straight: a curved or crooked groove would work, although manufacture would be more difficult.

Obviously the invention is not limited to the precise forms shown in the drawings.

What I claim is:

1. A self-locking nut comprising, in combination, a hollow casing which has fixed flanges providing two inturned annular shoulders at opposite ends thereof; a closely coiled helical spring fitted into the casing to abut both shoulders, the spring being so shaped on the inside that it may be threaded on a bolt or stud, said helical spring also having a multiplicity of waves which are flattened or straightened out by the reaction of the bolt or stud when the nut is threaded thereon, the reaction from the flattening out of said waves or deformations resiliently locking the nut on the bolt or stud; the helical spring having a groove formed on the exterior thereof parallel to the axis of the spring; and means permanently locking the casing and helical spring against relative rotation, said locking means engaging said groove with a slight peripheral clearance, and permitting slight helical creeping of the spring toward either end of the nut casing responsive to the reactions of flattening out said waves.

2. The invention as set forth in claim 1, wherein said locking means consists of a straight rib which is integral with the casing and projects inwardly from the inner cylindrical wall of the casing to engage the groove in the helical spring.

3. A self-locking nut comprising, in combination, a hollow casing with a generally cylindrical wall on its interior and an inturned flange integral with the casing at each of the opposite ends of said wall, said wall being provided with a groove extending parallel to the central axis thereof between said flanges, a helically coiled spring fitting snugly against said cylindrical wall and against said end flanges and having portions of each convolution shaped to fit the threads of the bolt for which the nut is designed, said thread-fitting portions projecting interiorly of the inner edges of said end flanges, said helically coiled spring also having a multiplicity of waves which are flattened by the reaction of threading the nut on said bolt thereby to resiliently grip the bolt, said spring having a groove formed on the exterior thereof parallel to the central axis of said spring, and a straight length of wire which lies both in the groove in the casing and in the groove in the spring with a slight peripheral clearance throughout its length and with the ends of said length of wire in abutment with said end flanges to retain said length of wire permanently in position within said grooves.

MARK HATTAN.

REFERENCES CITED

The following references are of record in the file of this patent:

UNITED STATES PATENTS

| Number | Name | Date |
|---|---|---|
| 829,591 | Libby | Aug. 28, 1906 |
| 1,228,671 | Hibbard | June 5, 1917 |
| 1,400,545 | Hleb | Dec. 20, 1921 |
| 2,358,707 | Haas | Sept. 19, 1944 |
| 2,386,197 | Dawson | Oct. 9, 1945 |
| 2,407,879 | Haas | Sept. 17, 1946 |

FOREIGN PATENTS

| Number | Country | Date |
|---|---|---|
| 356,456 | Germany | July 25, 1922 |